United States Patent [19]
Murayama

[11] Patent Number: 6,137,541
[45] Date of Patent: *Oct. 24, 2000

[54] IMAGE PROCESSING METHOD AND IMAGE PROCESSING APPARATUS

[75] Inventor: Yasuhiko Murayama, Suwa, Japan

[73] Assignee: Seiko Epson Corporation, Tokyo, Japan

[ * ] Notice: This patent is subject to a terminal disclaimer.

[21] Appl. No.: 09/333,260

[22] Filed: Jun. 15, 1999

Related U.S. Application Data

[63] Continuation of application No. 08/960,292, Oct. 29, 1997.

[30] Foreign Application Priority Data

Oct. 29, 1996 [JP] Japan .................................. P8-286905

[51] Int. Cl.$^7$ ....................................................... H04N 5/14
[52] U.S. Cl. ........................... 348/673; 348/671; 348/672; 382/172; 382/270; 358/455; 358/466
[58] Field of Search ..................................... 348/673, 672, 348/671, 625, 628, 629, 630, 631; 382/172, 270, 272, 274; 358/451, 455, 461, 466

[56] References Cited

U.S. PATENT DOCUMENTS

| | | | |
|---|---|---|---|
| 5,056,146 | 10/1991 | Nishide | 382/6 |
| 5,068,788 | 11/1991 | Goodenough et al. | 364/413.14 |
| 5,179,599 | 1/1993 | Formanek | 382/51 |
| 5,201,014 | 4/1993 | Degi et al. | 382/51 |
| 5,208,873 | 5/1993 | Nakajima | 382/50 |
| 5,268,773 | 12/1993 | Park et al. | 358/466 |
| 5,282,061 | 1/1994 | Farrell | 358/464 |
| 5,359,369 | 10/1994 | Izawa et al. | 348/672 |
| 5,454,049 | 9/1995 | Oki et al. | 382/172 |
| 5,553,166 | 9/1996 | Kakutani | 382/252 |
| 5,640,249 | 6/1997 | Rao et al. | 358/457 |
| 5,751,848 | 5/1998 | Farrell | 382/172 |
| 5,768,441 | 6/1998 | Yoshizawa et al. | 382/270 |

OTHER PUBLICATIONS

Nobuyuki Otsu, "An Automatic Threshold Selection Method Based on Discriminant and Least Squares Criteria", Denki Tsushin Gakkai Ronbun Magazine, '80/4 vol. J63–D No. 4, pp. 349–356.

*Primary Examiner*—Andrew I. Faile
*Assistant Examiner*—Habte Bahgi
*Attorney, Agent, or Firm*—Oliff & Berridge, PLC

[57] ABSTRACT

A method and apparatus are provided to allow threshold values needed for the desired number of gradations to be set through a simple process when converting image data with numerous values into a low number of gradations. The desired number of gradations is achieved without shading being noticeable even for images having shading. The cumulative frequency distribution of the pixels for each brightness is determined from image data having a brightness range with designated gradations. The average brightness and standard deviation of the portion that is primarily background is determined from this cumulative frequency distribution. The first threshold value is determined on the basis of this average brightness and standard deviation, the second through n–1st threshold values corresponding to the meaningful information are determined on the basis of this first threshold value. An n value conversion process is accomplished using these threshold values. Furthermore, this n value conversion process accomplishes n value conversion through a dither method for background pixels in order to reduce the effects of shading.

9 Claims, 9 Drawing Sheets th[2], th[3], ... SET TO DIVIDE TOTAL OF CUMULATIVE
NUMBER OF PIXELS INTO (n-1) EQUAL PARTS

IMAGE PROCESSING METHOD AND IMAGE PROCESSING APPARATUS

This is a Continuation of application Ser. No. 08/960,292 filed Oct. 29, 1997. The entire disclosure of the prior application is hereby incorporated by reference herein in its entirety.

BACKGROUND OF THE INVENTION

1. Field of the Invention

The invention relates to image processing technology in video or image-related equipment, and more particularly, to a method and apparatus for reducing the number of gradations, i.e., color shades or gray-scale, of an image input by, for example, a CCD camera, while reducing the effects of shading, i.e., differences in brightness caused by uneven lighting.

2. Description of Related Art

Recently, compact portable information processing equipment has been developed such that not only hand-written input information, but also images, can be input by installing, for example, a CCD camera. Such compact portable information processing equipment is typically provided with a display unit for both displaying the input information simultaneously with inputting the information, and for reading and displaying information already input. In consideration of battery life, a reflective liquid crystal display device, i.e., LCD, is commonly used as the display unit for this type of compact portable equipment.

This LCD in general has a small number of display gradations. For example, four gradations are frequently used. In contrast to this, a CCD camera using a CCD photography device has 256 gradations, which is a large number of gradations. Accordingly, when the image input by the CCD camera is displayed on the LCD, the number of gradations must be reduced using a gradation process, i.e., a halftoning process or an indexing process, for example.

A process for reducing the number of gradations is the "Ohtsu method" (see the Denki Tsushin Gakkai Ronbun Magazine, '84/4, vol. J63-D, No. 4, pg. 349). Other methods include an error diffusion method and a dither method.

The aforementioned "Ohtsu method" provides technology suitable for setting the threshold values used in binary conversion, but when this is used without modification, for example to obtain four gradations, three times the processing volume is required as in binary conversion. In other words, in converting to four values, it is necessary to determine three threshold values. Consequently, it is necessary to first accomplish the process for determining the threshold value used in binary conversion and then to determine in a similar manner the threshold values of each of the respective regions partitioned by this first threshold value. Consequently, the process of binary conversion must be performed three times. Hence the volume of computations becomes enormous and a problem arises that a long processing time is required.

On the other hand, the error diffusion method and the dither method are methods that output gradations two-dimensionally, i.e., halftoning, for example. Consequently, these methods have the defect that it is difficult to preserve edges of images. Hence, when an image such as a line drawing with characters or diagrams in the midst of a bright background is input and the gradation conversion process is performed, edge portions of the line drawing which are meaningful information thereof easily become unclear. Consequently, the problem arises that an image which looks good cannot be obtained. Accordingly, when inputting images, particularly for line drawings such as characters or diagrams, a binary conversion process using a fixed threshold value through, for example, the Ohtsu method is suitable.

However, for images having shading which are photographed by an area sensor such as, for example, a CCD camera, when a process is accomplished for reducing the number of gradations using a fixed threshold value in order to preserve the edges, a problem arises with respect to the background area. The background area that is darkened due to the effects of shading becomes smeared black and appears with contour lines in accordance with the threshold value. This area which is darkened because of the effects of shading is primarily the background area near the edges of the image. However, when small characters exist in this area, a problem arises that it becomes impossible to distinguish the characters. This results in an image which is not pleasing to the eye.

SUMMARY OF THE INVENTION

Hence, it is an object of the invention to provide an image processing method and apparatus which can set threshold values for achieving a desired number of gradations, i.e., color shades or gray-scale, via a simple process when an image processed with a high number of gradations is displayed on a display unit having a low number of gradations, and can set the desired number of gradations without shading being noticeable, even for images having shading.

In order to achieve the above objects, the image processing method of the invention is of the type of image processing method wherein image data, having a brightness range in designated gradations and including at least a background and meaningful information existing in the background, is converted to image data in n gradations (n>2), with n differing from the designated gradations. The cumulative frequency distribution of the pixels is determined for each brightness from the image data having a brightness range in the designated gradations. The average brightness and standard deviation of the part wherein the background is predominant are determined from this cumulative frequency distribution. A first threshold value that is an indicator of the boundary between the background and the meaningful information is determined on the basis of the average brightness and standard deviation. Second through n−1st threshold values corresponding to the meaningful information are determined on the basis of the first threshold value. The image data undergoes an n value conversion process using the first through n−1st threshold values which were determined.

The invention is effective, for example, when image data with a high number of gradations such as 256 is converted to image data with a small number of gradations, such as four gradations using a gradation process, i.e., a halftoning process or an indexing process, for example. The invention can determine the n−1 threshold values needed to convert to n values (n>2) by adding slight computations to the so-called "Ohtsu method". The "Ohtsu method" is suitable for binary conversions. However, when this method is applied without change for conversion to n values, where n is larger than two, the problem arises that the volume of computations becomes extremely excessive, as explained above. However, the invention reduces the amount of computations and moreover enables is visually good gradation conversion.

Also, the image processing method of the invention is of the type of image processing method wherein image data having a brightness range in designated gradations and including at least a background and meaningful information existing in this background is converted to image data in n gradations (n>2), with n differing from the designated gradations. The cumulative frequency distribution of the pixels is determined for each brightness from the image data having the brightness range in the designated gradations. The average brightness and standard deviation of the part wherein the background is predominant are determined from this cumulative frequency distribution. A first threshold value that is an indicator of the boundary between the background and the meaningful information is determined on the basis of this average brightness and standard deviation. The second through n−1st threshold values corresponding to the meaningful information are determined on the basis of this first threshold value. Furthermore, a determination is made as to whether there are effects from shading on the basis of the brightness value of the pixel being processed. For pixels for which it is determined that there are effects from shading, a determination is made as to whether that pixel is in the background or in the meaningful information. When it is a background pixel, an n value conversion process is accomplished through a gradation process having two-dimensional gradations, i.e., halftoning, for example. When the pixel is included in the meaningful information, an n value conversion process is accomplished using the first through n−1st threshold values.

In general, for images having shading and which are photographed by an area sensor such as, for example, a CCD camera, when a process is accomplished for reducing the number of gradations using a fixed threshold value in order to preserve the edges, a problem arises that smearing appears in dark areas at the periphery of the image because of shading, as described above. However, with the invention, for images for which it has been determined that the effects of shading may be experienced, a determination is made as to whether the pixel is in the background or in the meaningful information. When it is a background pixel, an n value conversion process is accomplished through a method that obtains two-dimensional gradations. When the pixel is one included in the meaningful information, an n value conversion process is accomplished using the first through n−1st threshold values. Consequently, a process is accomplished which preserves the edges for the meaningful information such as characters, and for other types of information. Accordingly, it is possible to make smearing unnoticeable and to reduce the effects caused by shading.

Furthermore, the first threshold value is a value determined by determining, from the cumulative frequency distribution, the average brightness and standard deviation of the part wherein the background is predominant. The value obtained by multiplying this standard deviation by a designated coefficient is subtracted from the average brightness. Furthermore, in the process for obtaining the second through n−1st threshold values in the area corresponding to the meaningful information on the basis of the first threshold value, the total of the cumulative frequencies for each brightness in the brightness range corresponding to the meaningful information is determined. This total of the cumulative frequency is divided by n−1. The respective threshold values are set as the brightness value for each cumulative frequency obtained by this division by n−1.

The first threshold value, which is an indicator of the boundary between the background and the meaningful information, is determined by using as parameters the average brightness and standard deviation of the area where the background predominates. Using this approach, it is possible to set a first threshold value suitable for the respective images. In addition, it is possible to determine the second through n−1st threshold values through a simple process on the basis of the first threshold value. In particular, it is possible to make the process even simpler by determining the second through n−1st threshold values by dividing the total of the cumulative frequencies into n−1 equal parts.

In addition, an acceptable method for dividing the total of the cumulative frequencies by n−1, is to divide the total of the cumulative frequencies into n−1 unequal parts with weighting. In this way, depending on the image, there are cases where a visually better image results when dividing the cumulative frequencies into unequal parts having a weighting.

In addition, the gradation process for obtaining the two-dimensional gradation is a gradation process that uses the dither method. An error diffusion method, can also be used to obtain the two-dimensional gradation. However, by using the dither method which requires a small volume of computations, it is possible to convert the number of gradations through a simple process and to make the effects caused by shading unnoticeable.

The meaningful information existing in the background may be line drawing information such as characters or a diagram. When a line drawing is considered to be the meaningful information, the invention can reduce the number of gradations and clearly preserve the edges of the line drawing. This occurs when, for example, image data in multiple gradations, such as with characters or a diagram drawn in a bright background, is converted for example into 4 values. It is possible to reduce the effects of shading without adding this effect to the edges of the characters or diagram even when reducing the effects of shading.

Furthermore, the image processing apparatus of the invention is of the type of image processing apparatus wherein image data having a brightness range in designated gradations and including at least a background and meaningful information existing in this background is converted to image data in n gradations (n>2), with n differing from the designated gradations. The apparatus includes a parameter computation unit for determining the cumulative frequency distribution of the pixels for each brightness from the image data having the brightness range in the designated gradations. The average brightness and standard deviation of the part wherein the background is predominant is determined from the cumulative frequency distribution. A threshold value computation unit determines a first threshold value that is an indicator of the boundary between the background and the meaningful information on the basis of the average brightness and standard deviation of the part where the background is predominant, as determined by the parameter computation unit, and second through n−1st threshold values corresponding to the meaningful information are determined on the basis of this first threshold value. Further, the apparatus of the invention includes an n value conversion process unit for accomplishing an n value conversion process on the image data using the first through n−1st threshold values which were determined by the threshold value computation unit.

The invention is effective, for example, when image data with a high number of gradations such as 256 is converted to image data having a small number of gradations, such as four gradations. The image processing apparatus can determine the n−1 threshold values needed to convert to n values (n>2) by adding slight computations to the so-called "Ohtsu method". The "Ohtsu method" is suitable for binary conversions. However, when this method is applied without change to conversion to n values, where n is larger than two, a problem arises that the volume of computations becomes extremely excessive, as described above. However, with the invention the volume of computations is reduced and moreover visually good gradation conversion is possible.

The image processing apparatus of the invention is of the type of image processing apparatus wherein image data having a brightness range in designated gradations and including at least a background and meaningful information existing in this background is converted to image data in n gradations (n>2), with n differing from the designated gradations. The apparatus includes a parameter computation unit for determining the cumulative frequency distribution of the pixels for each brightness from the image data having the brightness range in the designated gradations. The average brightness and standard deviation of the part wherein the background is predominant is determined from the cumulative frequency distribution. A threshold value computation unit determines a first threshold value that is an indicator of the boundary between the background and the meaningful information on the basis of the average brightness and standard deviation of the part where the background is predominant, as determined by the parameter computation unit. The second through n−1st threshold values corresponding to the meaningful information is determined on the basis of this first threshold value. The apparatus further includes an n value conversion process unit for making a determination as to whether there are effects from shading on the basis of the brightness value of the pixel being processed. For pixels for which it is determined that there are effects from shading, determination is made as to whether that pixel is in the background or in the meaningful information, and accomplishing an n value conversion process through a gradation process having two-dimensional gradations when it is a background pixel, and accomplishing an n value conversion process using the first through n−1st threshold values when the pixel is included in the meaningful information.

For images for which it has been determined that there is a possibility of receiving the effects of shading, a determination is made as to whether that pixel is in the background or in the meaningful information. When the pixel is a background pixel, an n value conversion process is accomplished through a method that obtains two-dimensional gradations. When the pixel is included in the meaningful information, an n value conversion process is accomplished using the first through n−1st threshold values. Consequently, a process is accomplished which preserves the edges of the meaningful information such as characters. For other types of information, it is possible to reduce the effects caused by shading.

The first threshold value computation process accomplished by the threshold value computation unit determines the average brightness and standard deviation of the part wherein the background is predominant from the cumulative frequency distribution. The value obtained by multiplying this standard deviation by a designated coefficient is subtracted from the average brightness. Furthermore, in the process for determining the second through n−1st threshold values on the basis of the first threshold value determined by the threshold value computation unit, the total of the cumulative frequencies is determined for each brightness in the brightness range corresponding to the meaningful information. This total of the cumulative frequency is divided by n−1. The respective threshold values are set as the brightness value for each cumulative frequency obtained by this division by n−1.

In this manner, the first threshold value which is an indicator of the boundary between the background and the meaningful information, is determined using as parameters the average brightness and standard deviation of the area where the background predominates. Also, it is possible to set a first threshold value suitable for the respective images. In addition, it is possible to determine the second through n−1st threshold values through a simple process on the basis of the first threshold value. In particular, it is possible to make the process even simpler by determining the second through n−1st threshold values by dividing the total of the cumulative frequencies into n−1 equal parts.

In addition, as a method for dividing the total of the cumulative frequencies by n−1, the total of the cumulative frequencies may be divided into n−1 unequal parts with weighting. In this way, depending on the image, there are cases where a visually better image results when dividing the total of the cumulative frequencies into unequal parts having a weighting.

In addition, the gradation process for obtaining the two-dimensional gradation uses the dither method. As a method for obtaining the two-dimensional gradation, an error diffusion method may also be used. However, by using the dither method, which requires a small volume of computations, it is possible to convert the number of gradations through a simple process and to make the effects caused by shading unnoticeable.

The meaningful information existing in the background may be line drawing information such as characters or a diagram. When a line drawing is considered as the meaningful information, the invention can reduce the number of gradations and preserve the edges of a line drawing. For example, when image data in multiple gradations, such as with characters or a diagram drawn in a bright background, is converted for example into 4 values, it is possible to reduce the effects of shading without adding this effect to the edges of the characters or diagrams even when reducing the effects of shading.

BRIEF DESCRIPTION OF THE DRAWINGS

These and other aspects and advantages of the invention will become apparent from the following detailed description of preferred embodiments when taken in conjunction with the accompanying drawings, in which.

DETAILED DESCRIPTION OF PREFERRED EMBODIMENTS

Figure 1:
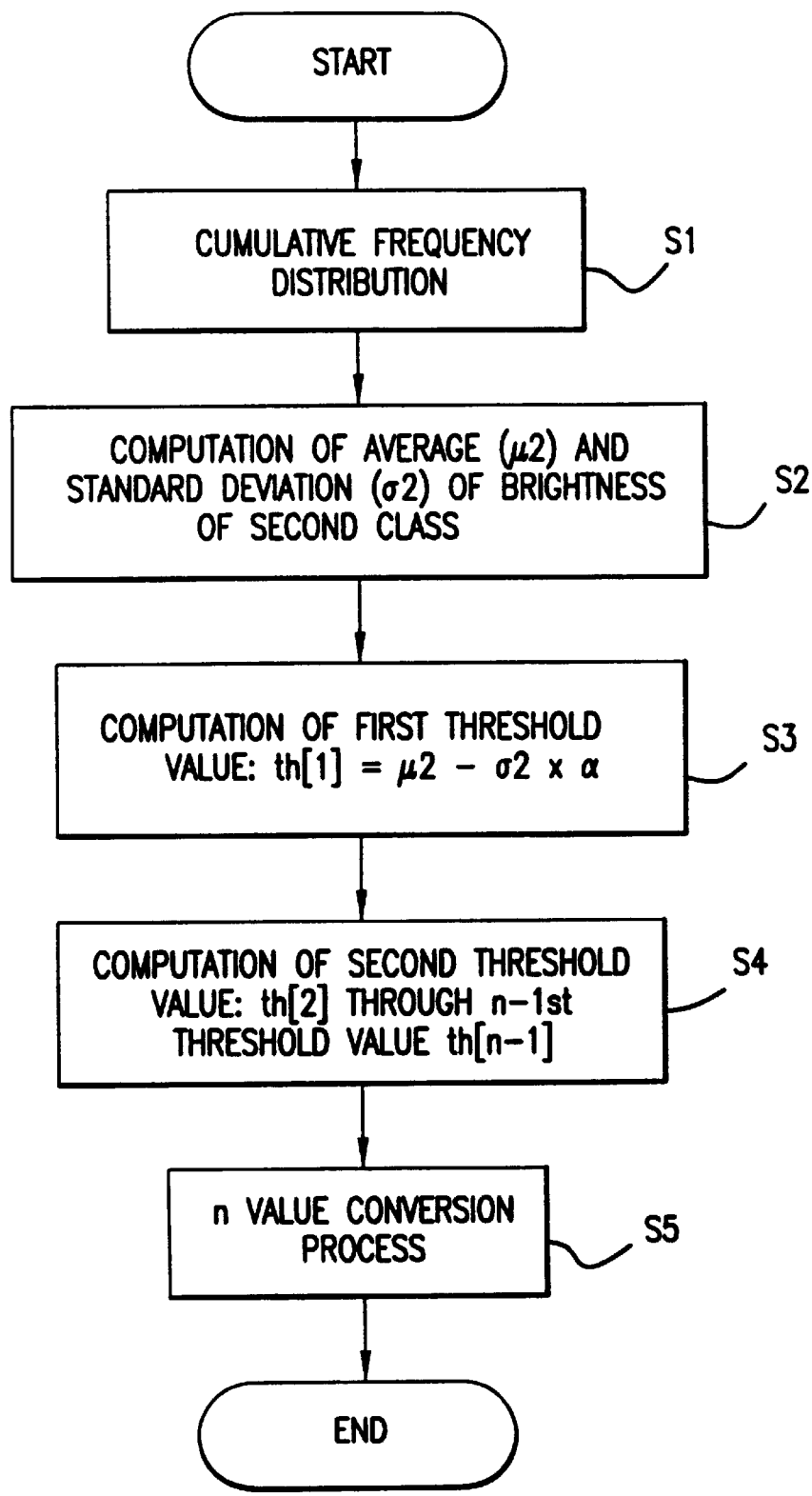
FIG. 1 is a flowchart describing the overall processes of an embodiment of the invention.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate similar elements.

In these embodiments, the image being photographed is assumed to be an image wherein a line drawing, such as characters or a diagram, is drawn as meaningful information in a bright background. The explanation will be for the case where this kind of image is input by a CCD camera and undergoes image processing.

FIG. 1 is a flowchart describing the processes of an embodiment of the invention. Hereafter, the order of these processes will be described.

Figure 2A:
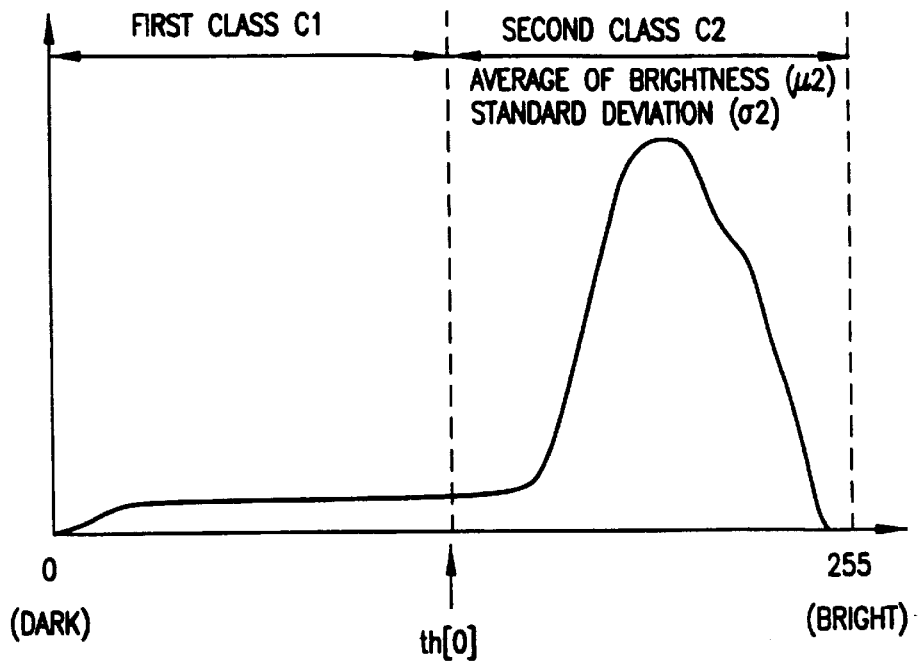
FIGS. 2(a) and 2(b) show an example of the cumulative frequency distribution of pixels with respect to the brightness value, and the setting of the threshold values.

First, the cumulative frequency distribution is determined for the image data input by the CCD camera (step s1). An example of the cumulative frequency distribution that is determined is shown in FIG. 2a. The image being processed, as discussed above, is assumed to be an image such that a line drawing, such as characters or a diagram, is drawn on a bright background occupying the largest portion of the image. Consequently, the curve of the cumulative frequency for each brightness in the brightness range of 0 to 255 is, as shown in FIG. 2a, a curve in which the cumulative frequency is larger on the side with high brightness. In this case, the brightness range of the CCD camera is assumed to be 256 gradations ranging from 0 to 255.

Furthermore, using this kind of cumulative frequency distribution, the binarization threshold value th[0] is determined by the "Ohtsu method". Of the regions partitioned by this binarization threshold value, the low brightness side is designated as the first class C1 and the high brightness side is the second class C2. The cumulative frequencies in the first class C1 are primarily from the line drawing, while the cumulative frequencies in the second class C2 are primarily from the background.

Next, the average $\mu 2$ and the standard deviation $\sigma 2$ of the brightness in the second class C2 are computed (step s2). The larger part of the second class C2 is occupied by background. Consequently, the average value $\mu 2$ of the brightness in the second class C2 can be thought of as substantially the average value of the brightness of the background. Furthermore, the first threshold value th[1] out of the n−1 threshold values used in conversion to n values is determined (step s3) using the average $\mu 2$ and the standard deviation $\sigma 2$ of the brightness. This first threshold value th[1] is determined from:

$$th[1] = \mu 2 - \sigma 2 \times \alpha \quad (1)$$

In equation (1), $\alpha$ is a coefficient. In experiments, good results were obtained by setting $\alpha = \frac{1}{2}$. However, this example is intended to be illustrative and not limiting, since the optimum value may be set depending on a variety of conditions.

This first threshold value th[1] determined from equation (1) is indicative of essentially the boundary between the line drawing and the background. The boundary between the line drawing and the background can be considered to be on the dark side of the average value $\mu 2$ of the brightness of the background. Accordingly, the first threshold value th[1] may be a value obtained by subtracting a certain value from the average value $\mu 2$ of the brightness of the background.

Figure 2B:
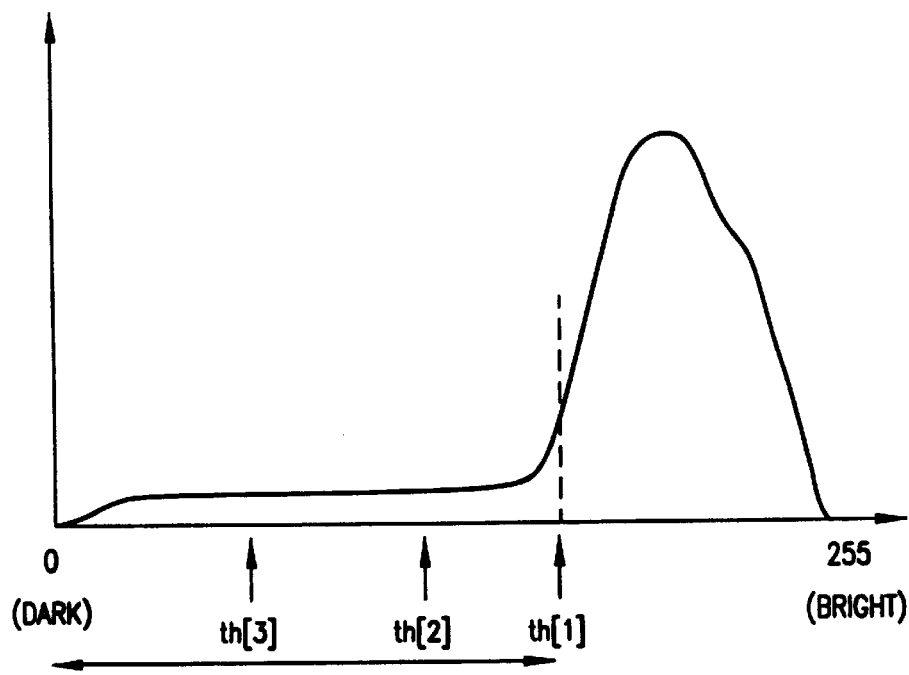

However, even if the color of the background is assumed to be uniform, the cumulative frequency of the brightness of the background includes a width of the portion of the cumulative frequency corresponding to the background. This width differs depending on the photography state and the device that inputs the image. In particular, in an image with shading photographed by an area sensor such as, for example, a CCD camera, the fluctuation in the width is severe. Hence, in order to absorb the fluctuations in the width of the portion of the cumulative brightness corresponding to the background, the first threshold value th[1] is determined by using the standard deviation $\sigma 2$ of the second class C2, which is an indication of width, as a parameter and subtracting from the average value $\mu 2$ of the brightness of the background a value which is this parameter multiplied by a suitable coefficient $\alpha$. The first threshold value th[1] determined in this manner is shown in FIG. 2b.

Next, in step s4 of FIG. 1, other threshold values are determined based on this first threshold value th[1]. Here, assuming the number of gradations to be determined is n, n−1 threshold values are determined. Accordingly, in this step s4, the second threshold value th[2] through the n−1st threshold value th[n−1] are determined based on the first threshold value th[1]. The process of determining the second threshold value th[2] through the n−1st threshold value th[n−1] based on the first threshold value th[1] is explained hereafter.

The number of cumulative pixels for each brightness less than or equal to the first threshold value th[1] are all added together to find the total number of cumulative pixels, and this total number of cumulative pixels is divided into n−1 equal parts. In this embodiment, the number of gradations to be determined is assumed to be 4 gradations (n=4). Consequently, the number of pixels for each brightness less than or equal to the first threshold value th[1] are added and the resulting total number of cumulative pixels is divided into three equal parts to determine the second threshold value th[2] and the third threshold value th[3].

As an example, suppose that the total number of cumulative pixels obtained by adding together the number of cumulative pixels for each brightness less than or equal to the first threshold value th[1] is 120. The result "40" is obtained by dividing this into three equal parts. Then, a threshold value is set every 40 pixels. Specifically, the number of cumulative pixels for each brightness is added from brightness 0 in the bright direction, and the location where the total number of pixels reaches 40 pixels is set as a threshold value (the third threshold value th[3]). The number of cumulative pixels for each brightness is then added from this third threshold value in the bright direction and the location where the total number of pixels again reaches 40 pixels is set as a threshold value (the second threshold value th[2]). In this manner, the second and third threshold values th[2] and th[3] are determined. FIG. 2b shows one example of the second threshold value th[2] and the third threshold value th[3].

Figure 3:
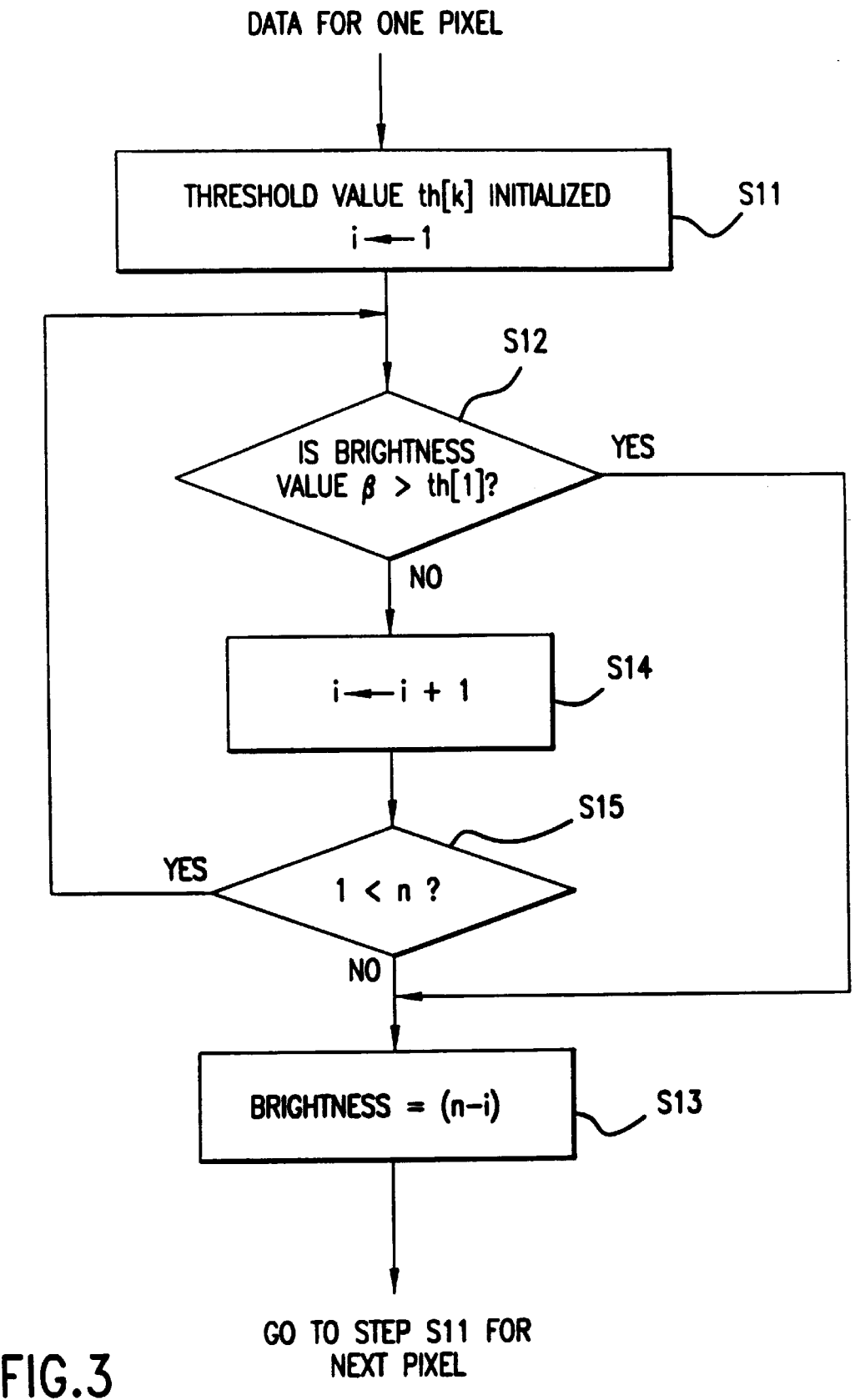
FIG. 3 is a flowchart describing the n value conversion process of an embodiment of the invention.

When the first through n−1st threshold values have been determined in this manner, an n value conversion process is then accomplished (step s5). Hereafter, this n value conversion process will be described with reference to FIG. 3. The flowchart in FIG. 3 shows an n value conversion process for one particular pixel. In FIG. 3, first an initialization is performed to determine which of the threshold values will be selected out of the first through n−1st threshold values (step s11). This initialization is i=1 in this case. That is to say, the first threshold value th[1] is set as the initial threshold value. Next, for the brightness value β of the pixel being processed, the determination is made as to whether β>th[i] (step s12). In this case, i=1, so the determination is whether β>th[1]. Furthermore if β>th[1], the brightness value of the pixel is set to n−i (step s13). Here, assuming that the brightness values of the pixels are converted to the four values 0–3, when β>th[1], the brightness value of this pixel is set to "3" because n=4 and i=1.

In this manner, when the n value conversion (here a four value conversion) process is completed for one particular pixel, the n value conversion process is accomplished for the next pixel. For the next pixel also, a determination is made for the brightness β as to whether β>th[1], the same as above. Furthermore, when β>th[1] is not true, the flowchart moves to step s14 and i is incremented to i+1 (in this case, i=2). Then a determination is made as to whether i<n (step s15). When i<n, the flowchart returns to step s12 and at this time a determination is made as to whether β>th[2]. If β>th[2], the brightness value of this pixel is set to n−i (step s13). This time, n=4 and i=2, so the brightness value of the pixel is set to "2". On the other hand, when β>th[2] is not true in the determination of whether β>th[2] in step s12, the flowchart moves to step s14 and i is incremented to i+1. Through this, the state i=3 is reached. A determination is made as to whether i<n (step s15) and when i<n, the flowchart returns to step s12. At this time a determination is made as to whether β>th[3]. Then, if β>th[3], the brightness value of this pixel is set to n−i. This time, n=4 and i=3, so the brightness value of the pixel is set to "1".

Figure 4:
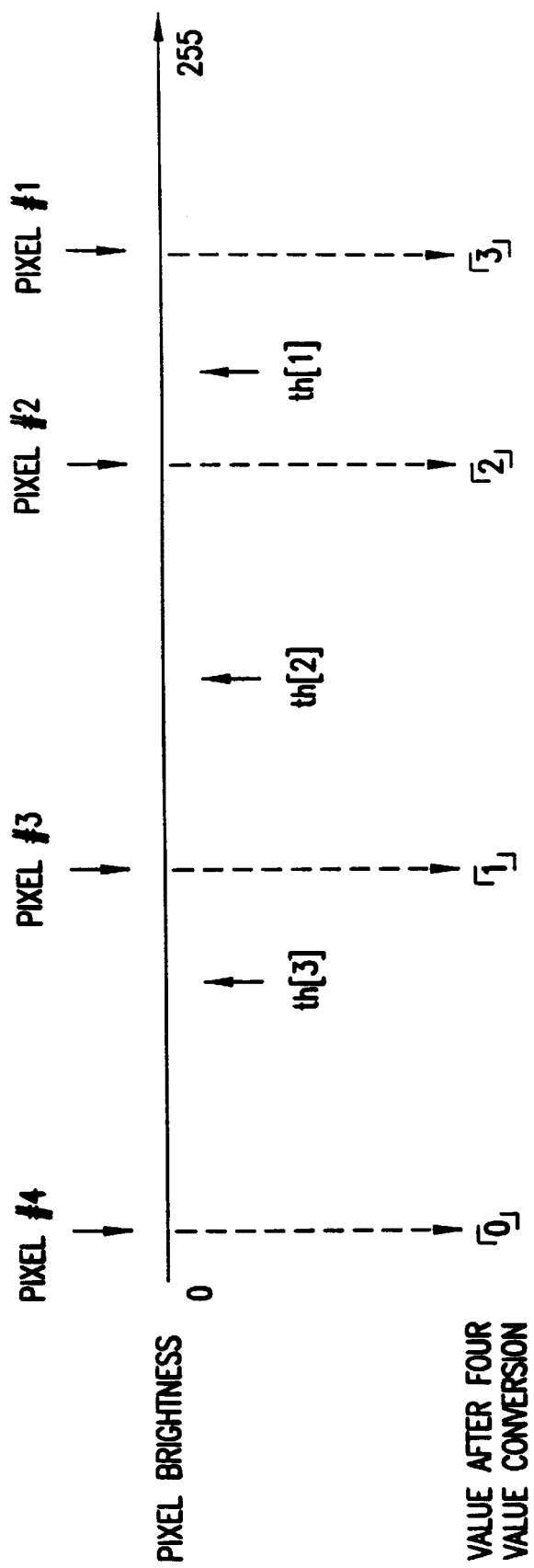
FIG. 4 shows an example of four value conversion using the relationship between the brightness of the pixels and the three threshold values set in an embodiment of the invention.

Furthermore, the same process is accomplished for the next pixel. FIG. 4 shows the relationship between the respective brightness values (0–255) of the pixels being processed, the first through third threshold values th[1]–th[3], and the brightness values after n value conversion (four value conversion). For example, if the brightness value of pixel #1 being processed is larger than the first threshold value th[1], the brightness value after four value conversion (with brightness range "0" to "3") becomes "3". If the brightness value of pixel #2 being processed is larger than the second threshold value th[2], but not greater than the first threshold value th[1], the brightness value after four value conversion becomes "2".

In addition, if the brightness value of pixel #3 being processed is larger than the third threshold value th[3] but not greater than the second threshold value th[2], the brightness value after four value conversion becomes "1". When the brightness value of pixel #4 being processed is not greater than the third threshold value th[3], the brightness value after four value conversion becomes "0".

Figure 5:
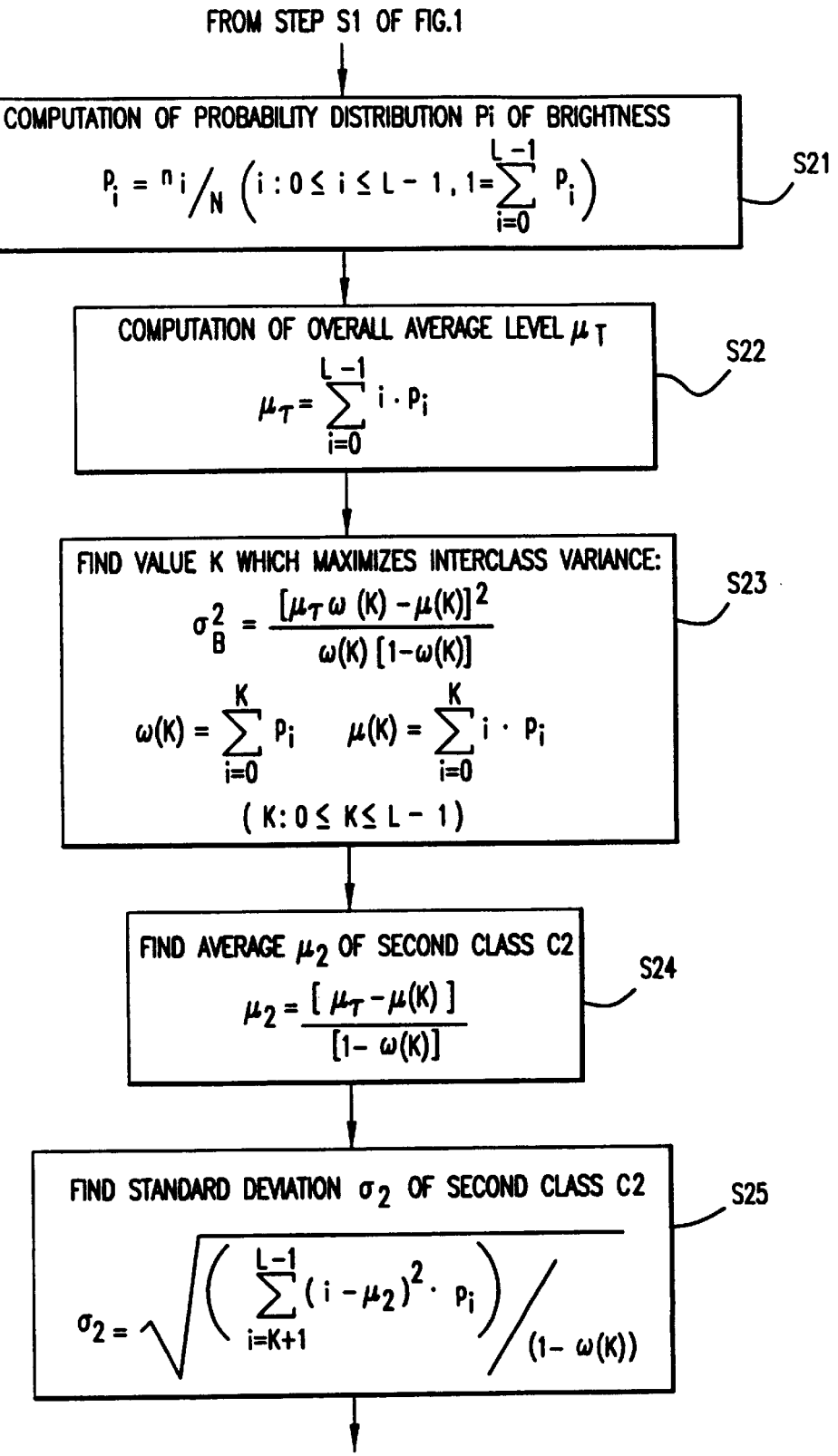
FIG. 5 is a flowchart describing the process of computing the average value $\mu 2$ and the standard deviation $\sigma 2$ of the second class C2 which is primarily background portion.

The computation of the average $\mu 2$ of the brightness and the standard deviation σ2 in the second class C2 shown in the flowchart in FIG. 1 is a computation made using the sequence shown in FIG. 5. First, the probability distribution Pi of the brightness is computed (step s21). This probability distribution Pi of the brightness is a value indicating with what ratio the pixels exist in each brightness, and is expressed as follows:

$$P_i = {}^{n_i}/_N \quad (2)$$

In equation 2, "ni" is the number of pixels with the brightness i, and "N" is the total number of pixels. Here, the brightness range S is expressed as S=0, 1, 2, 3, . . . , L−1 (where L is the number of gradations and L=256 for 256 gradations). The brightness i is expressed as $0 \leq i \leq (L-1)$, and the total number of pixels N is expressed as n0+n1+n2+. . . +n(L−1). In addition, when the Pi for each brightness are summed from brightness 0 through brightness L−1, the total is 1. In other words, $$\sum_{i=0}^{L-1} P_i = 1 \quad (3)$$

When the probability distribution Pi of the brightness is determined in this manner, then the average brightness $\mu_T$ of all classes is determined (step s22). This $\mu_T$ is determined from:

$$\mu_T = \sum_{i=0}^{L-1} i \cdot P_i \quad (4)$$

Next, the K which maximizes the interclass variance $\sigma_B^2$ is determined (step s23). This interclass variance $\rho_B^2$ is expressed as:

$$\sigma_B^2 = \frac{[\mu_T \omega(K) - \mu(K)]^2}{\omega(K)[1 - \omega(K)]} \quad (5)$$

The ω(K) and $\mu(K)$ in equation (5) are expressed as:

$$\omega(K) = \sum_{i=0}^{K} P_i \quad (6)$$

$$\mu(K) = \sum_{i=0}^{K} i \cdot P_i \quad (7)$$

In addition, the range where K is obtained in equation (6) and equation (7) is $0 \leq K \leq (L-1)$.

Next, the average brightness $\mu_2$ of the second class C2 is determined (step s24). This average brightness $\mu_2$ is determined from:

$$\mu_2 = \frac{[\mu_T - \mu(K)]}{[1 - \omega(K)]} \quad (8)$$

At this time, the K in equation (8) is the value that maximizes the value of $\sigma_B^2$ determined in step s23. Then, the standard deviation σ2 of the second class C2 is determined. The standard deviation σ2 is expressed as:

$$\sigma_2 = \sqrt{\left(\sum_{i=K+1}^{L-1} (i - \mu_2)^2 \cdot P_i\right) / (1 - \omega(K))} \quad (9)$$

At this time, the K in equation (9) is the value that maximizes the value of $\sigma_B^2$ determined in step s23.

In this manner the average brightness $\mu 2$ and standard deviation σ2 of the second class C2 are computed.

Furthermore, the processes from step s3 on, in the flowchart in FIG. 1, are accomplished using the average brightness μ2 and standard deviation σ2 which have been determined.

Figures 6, 8:
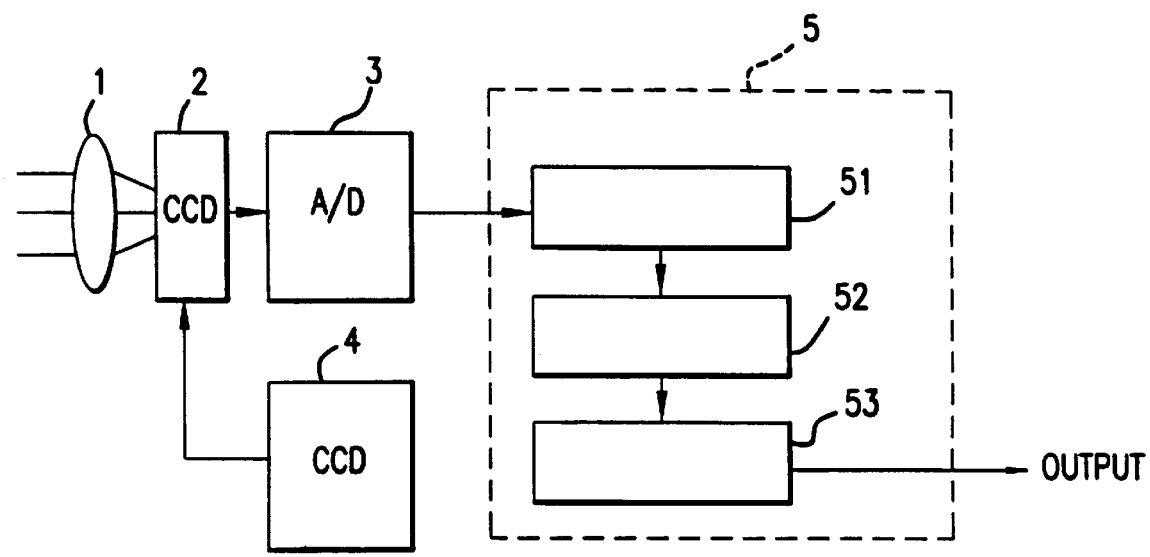
FIG. 6 shows the image processing apparatus of the invention.
FIG. 8 shows one example of a dither matrix used in an embodiment of the invention.

FIG. 6 shows the arrangement of an embodiment and is an example of an apparatus that accomplishes the process of reducing the number of gradations of an image input by a CCD camera (e.g., an image with 256 gradations). In FIG. 6, the main elements of the arrangement are a lens 1, a CCD camera 2, an A/D converter 3, a CCD control circuit 4 and an image processing apparatus 5.

Such image processing apparatus accomplishes the various processes described above. Also, the image processing apparatus has at least a parameter computation unit 51, a threshold value computation unit 52 and an n value conversion process unit 53.

The parameter computation unit 51 accomplishes the process of computing the average μ2 and the standard deviation σ2 of the brightness in the second class C2. This process is accomplished after the processes of steps s1 and s2 in the flowchart in FIG. 1, i.e., after the cumulative frequency distribution has been determined from the image data after digital conversion. In addition, the threshold value computation unit 52 accomplishes the processes in steps s3 and s4 in FIG. 1 using the computation results from the parameter computation unit 51, and accomplishes computation of the first through n–1st threshold values th[1] through th[n–1]. Furthermore, the n value conversion process unit accomplishes the n value conversion process shown in the flowchart in FIG. 3 using the first through n–1st threshold values th[1] through th[n–1] determined by the threshold value computation unit 52. The details of these processes have already been described and hence explanation of such is omitted here.

As explained above, with this embodiment, for example when image data with a high number of gradations such as 256 is converted to image data with a small number of gradations, such as four gradations, it is possible to determine the n–1 threshold values needed to convert to n values (n>2) by adding slight computations to the so-called "Ohtsu method". The first threshold value is computed using as parameters the average brightness μ2 and standard deviation σ2 of the second class C2 containing a large amount of background. Consequently, it is possible to set the boundary between the background and line drawing in an area suitable for each respective image. Also, it is possible to obtain a visually good image even when the number of gradations is reduced.

As described above, for an image having shading, i.e., difference in brightness caused by uneven lighting photographed by an area sensor such as, for example, a CCD camera, when a process is accomplished for reducing the gradations using fixed threshold values in order to preserve the edges, smearing appears in the dark portion. The dark portion is the portion where the brightness value of the background part is not greater than the maximum threshold value for an image that receives the effects of shading. A problem is caused that smearing appears as contour lines in accordance with the threshold values. The effects caused by shading easily appear over a certain area in the portion primarily near the edges of the image being input, hereafter called the periphery of the image. When a simple binarization process is accomplished, the entirety of the dark portions of the periphery of the image appear smeared.

Figure 7:
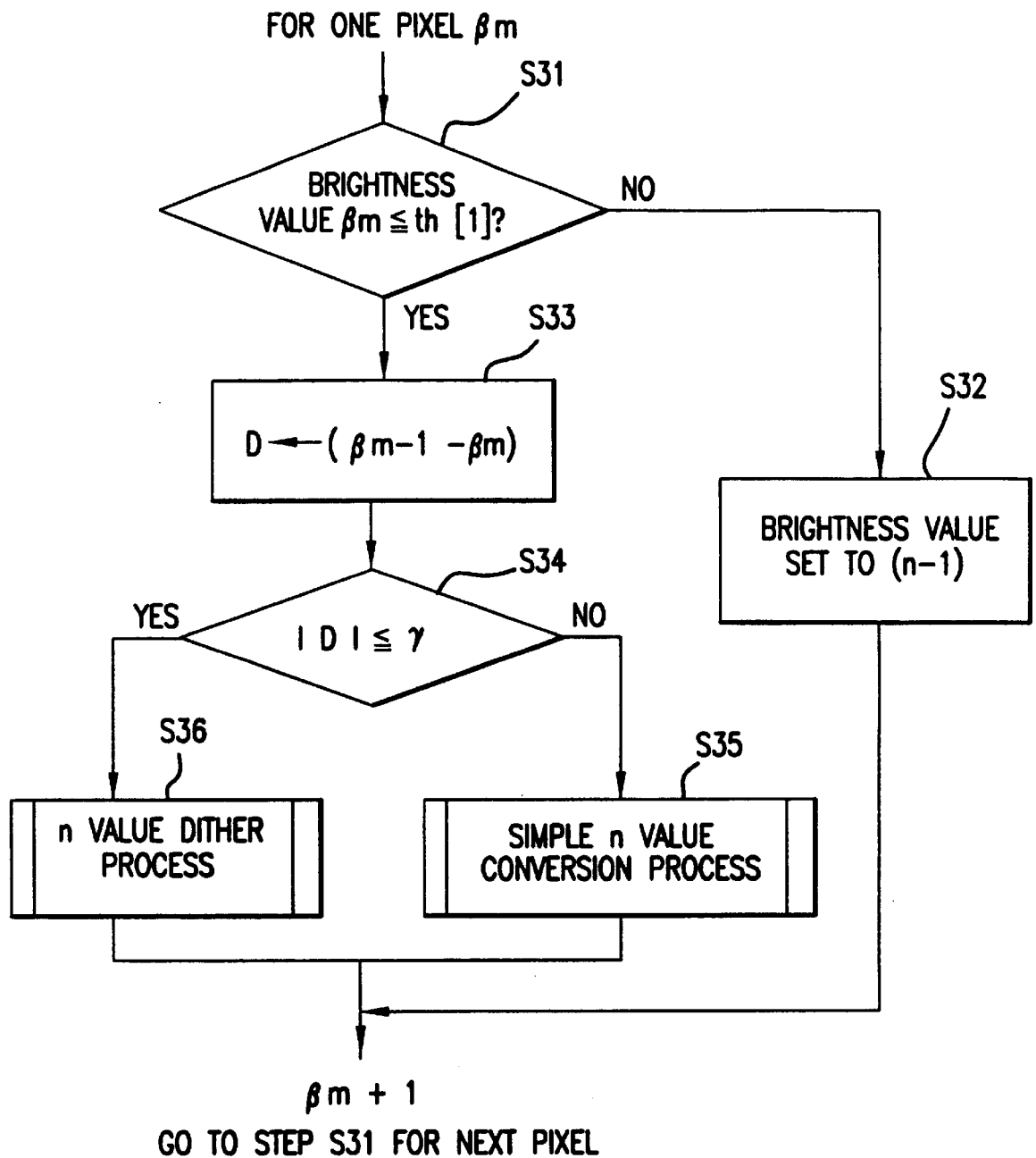
FIG. 7 is a flowchart describing the process of determining whether a pixel is a background pixel or a line drawing pixel, and selecting the n value conversion process in accordance with such determination, in an embodiment of the invention.

This embodiment of the invention reduces the occurrence of the dark portions near the periphery of the image appearing smeared because of the effects of shading. As a method to reduce this, the n value conversion process, described in the embodiment described above (see step s5 in FIG. 1, and the flowchart in FIG. 3), is modified into the type of process described hereafter. While this further embodiment is described hereafter, the method of determining the n–1 threshold values is the same as in steps s1 through s4 of FIG. 1. Consequently, the n value conversion process will be described with reference to the flowchart in FIG. 7.

First, a determination is made as to whether the brightness value βm of the pixel being processed is such that βm≦th[1] (step s31). When the brightness value βm of the pixel being processed is larger than the first threshold value th[1], the pixel is considered to have sufficient brightness. Consequently, smearing does not appear after n value conversion because of the effects of shading. Hence, the brightness value of that pixel is set to n–1 (step s32), i.e., when for example performing a four value conversion as described in the above-described embodiment. At this time the brightness value is set to "3".

Alternatively, when βm≦th[1] in the aforementioned step s31, i.e., when the brightness value βm of the pixel being processed is not greater than the first threshold value th[1], the pixel is considered to not have sufficient brightness. Consequently it is determined that the background area will appear as smearing after n value conversion because of the effects of shading. Thus, the processes from step s33 on are accomplished.

The processes from step s33 on determine whether the pixel being processed is a pixel of a line drawing or a pixel of something else such as background. Also, the processes accomplish the normal n value conversion process described in the above embodiment (called a "simple n value conversion process") when the pixel comprises a line drawing, and accomplish an "n value dither process" when the pixel comprises the background. Hereafter, this series of processes will be described.

When it has been determined that βm≦th[1], a value D is determined by subtracting the brightness value βm of the pixel being processed from the brightness value βm–1 of the pixel immediately prior to the pixel being processed (step s33). Furthermore, in step s34 the absolute value of D and a certain constant γ are compared. When |D|≦γ is not true (when the difference in brightness between the pixel being processed and the immediately prior pixel is large), the pixel being processed is deemed to be one part comprising a line drawing. Thus, the simple n value conversion process is accomplished (step s35), after which the same processes as described above are accomplished from step s31 on for the next pixel. This constant γ is a predetermined constant and is a value used to determine whether the image is a line drawing. The determination is made based on the difference between the brightness value of the immediately prior pixel and the brightness value of the pixel being processed. As one illustrative example, good results were obtained when determination was made with γ=15. However, such value is not limiting and various settings are possible depending on a variety of conditions.

Alternatively, when |D|≦γ (when the difference in brightness between the pixel being processed and the immediately prior pixel is small) in step s34, the pixel being processed is deemed to be one part comprising the background. Thus, an n value dither method is accomplished (step s36). This dither method is described hereafter.

FIG. 8 shows one example of a dither matrix for converting brightness values of 256 gradations from 0 to 255 to brightness values of 4 gradations from 0 to 3. A process such as the one shown in FIG. 9 is accomplished for the respective pixels using this kind of dither matrix.

Figure 9:
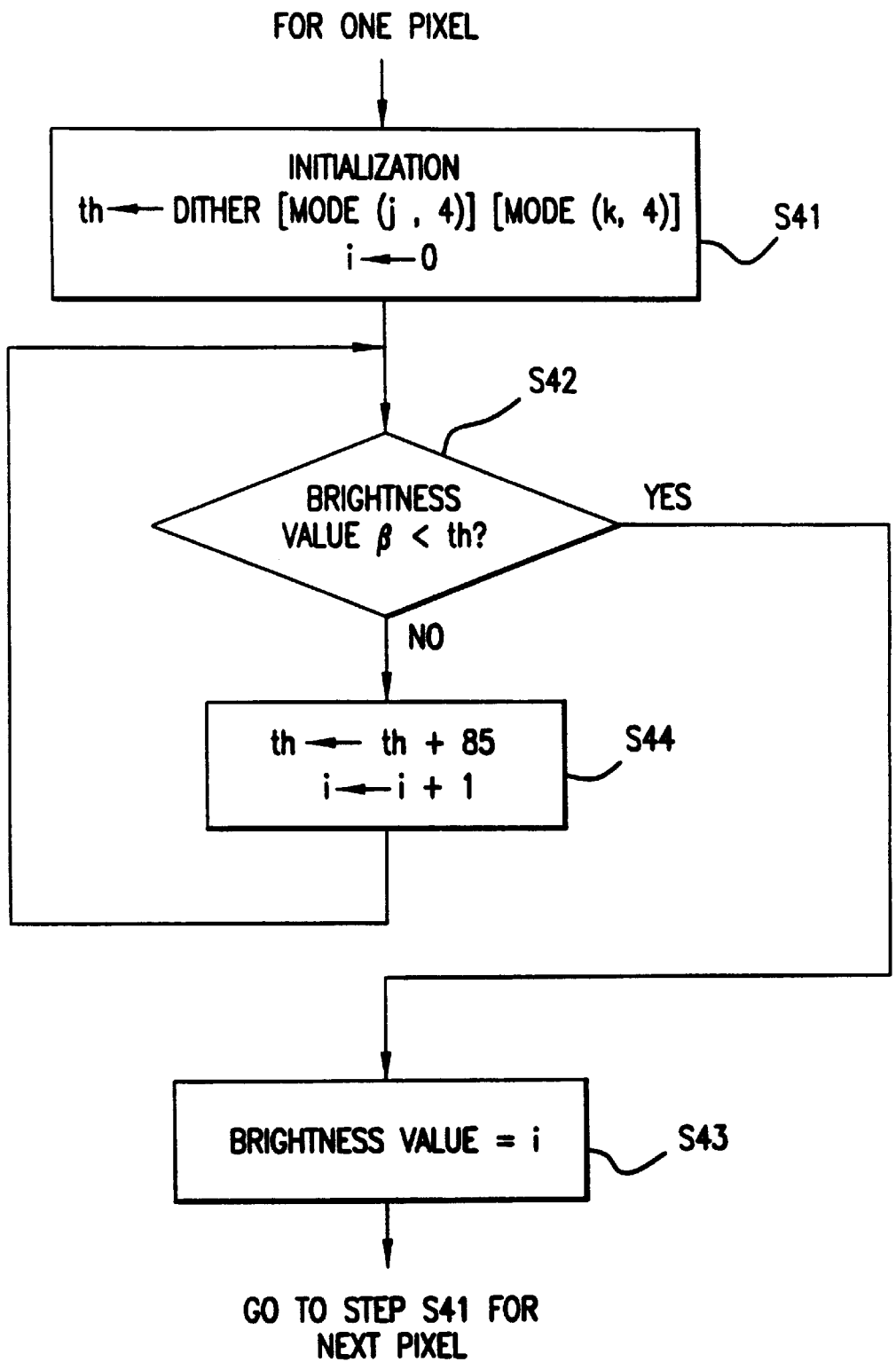
FIG. 9 is a flowchart describing the n value conversion process using the dither process in an embodiment of the invention.

In FIG. 9, first initialization is performed (step s41). Assuming the pixel being processed is the pixel in the position of row j, column k of the image, this initialization process determines the remainder [mode (j,4)] of dividing j by 4 and the remainder [mode (k,4)] of dividing k by 4. The process sets the value of the dither matrix at the corresponding position as the initial value of the threshold value of the pixel. For example, assuming that the pixel being processed is at j=100 and k=101, when these are respectively divided by 4 the remainders are 0 and 1. Making reference to the dither matrix of FIG. 8 using these values, the value "48" in row 0, column 1 of the dither matrix is selected as the threshold value. This threshold value used as an initial value is appropriate for the third threshold value (the third threshold value th[3] on the darkest side) out of the first through third threshold values discussed above. Furthermore, i=0 is set as an initialization process. This i takes the value of one of the four values (0 to 3), and is set to i=0 as the initial value.

After the above-described initialization is completed, a comparison is made between the brightness value β of the pixel value being processed and the threshold value initially set (this threshold value is expressed as the threshold value th[3]). Furthermore, if β<th[3], the brightness value of that pixel is set to i (in this case, i=0) (step s43). Then the processes are accomplished in order from step s41 for the next pixel.

On the other hand, if β<th[3] is not true in step s42, the value determined by adding 85 (255/(4−1)) to the initial threshold value is set as the new threshold value. This new threshold value is expressed as the second threshold value th[2]). The value i is incremented to i+1 and is set as the new i (i=1) (step s44). Then, the flowchart returns again to step s42, where a comparison is made between the brightness value β of the pixel and the newly set threshold value (in this case, th[2]). If β<th[2], the brightness value of this pixel is set to i (in this case, i=1). The processes are accomplished in order from step s41 for the next pixel. In addition, if β<th[2] is not true in step s42, the value determined by adding another 85 to the current threshold value is set as the new threshold value (expressed as the first threshold value th[1]). The value i is incremented to i+1 and is set as the new i (i=2) (step s44). Then, the flowchart returns again to step s42, where a comparison is made between the brightness value β of the pixel and the newly set threshold value (in this case, th[1]). If β<th[1], the brightness value of the pixel is set to i (in this case 2). The processes are accomplished in order from step s41 for the next pixel.

In such manner, with this embodiment a simple n value conversion process, as described in the above embodiment, which can preserve the edge information, is accomplished for line drawings. An n value conversion process using a dither process that can obtain two-dimensional gradations is accomplished for the background portions. Accordingly, an n value conversion process is provided for line drawings such as characters in a state in which the edges are preserved. In addition, an n value conversion process is accomplished by the dither process for background portions in which the effects of shading occur. Through this, the contour line-shape smearing of the background portion, in accordance with the threshold values which occurs during the simple n value conversion process because of the effects of shading, is reduced. The result is smooth change. The apparatus of this embodiment can accomplish the above-described process in an n value conversion process unit in the apparatus shown in FIG. 6.

However, in the above-described embodiments, it is possible to simplify the overall process by using a threshold value determined using the data of the prior frame, for example, one screen worth of data, when image data is continuously input from a CCD camera. Hereafter, this will be described with reference to the flowchart in FIG. 10.

Figure 10:
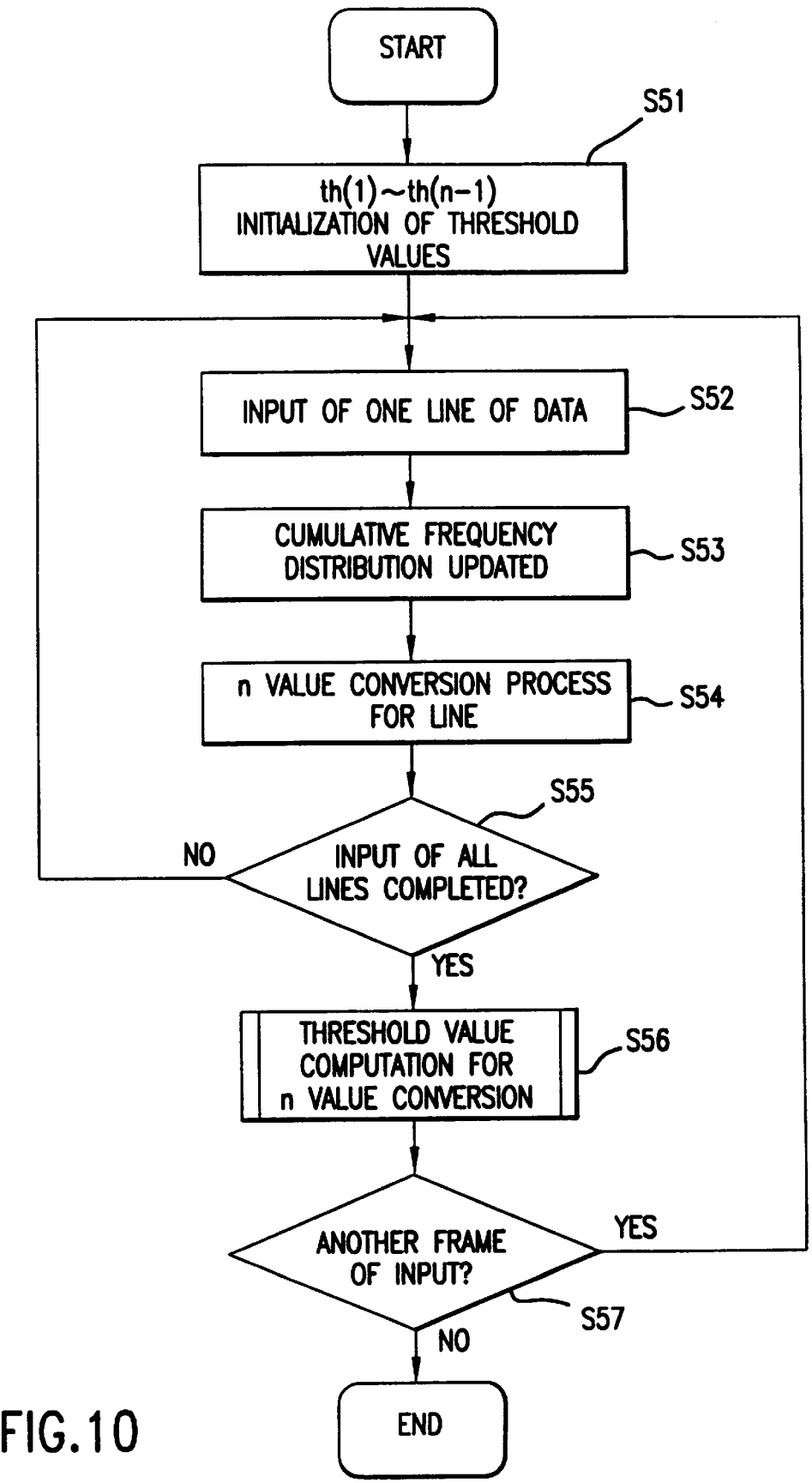
FIG. 10 is a flowchart describing the overall process when the image data is continuously input.

In FIG. 10, initialization of the threshold values is accomplished (step s51). This initialization of the threshold values, for example when performing n value conversion, initializes the values of the threshold values th[1] through th[n−1]. Next, after inputting one line of data in a given frame has been accomplished (step s52), updating of the cumulative frequency partial distribution is accomplished by this one line of input data in order to ultimately determine the cumulative distribution of the frame (step s53). Also, an n value conversion process is accomplished on this line (step s54). This n value conversion process of step s54 is achieved as an n value conversion process using the threshold values determined from the previous frame. The n value conversion process may be either the simple n value conversion process explained in the above first described embodiment, or may be the n value conversion including the dither process explained in the above second described embodiment.

Then, a determination is made as to whether the processes have been completed for all lines in the frame (step s55). If the processes have not been completed, the flowchart returns to step s52 and the processes in steps s52–s55 are accomplished. Through this, the cumulative frequency distribution for the whole frame is determined by updating the cumulative frequency distribution in step s53.

In this manner, when the processes for a particular frame have been completed, the threshold values needed for n value conversion are computed (step s56). The threshold value computation process used in this n value conversion accomplishes the sequence from step s2 through s4 explained in the first described embodiment using the cumulative frequency distribution for the whole frame determined in above-described step s53 (see the flowchart in FIG. 1). Then, a determination is made as to whether there is a next frame input (step s57). If there is a next frame, the flowchart returns to the process in step s52. Thus, when image data is continuously input, the threshold value determined in the previous frame is used in processing the frame data currently being input, making it possible to cope with continuous input.

However, the cumulative frequency distribution described in the respective embodiments need not be determined from the entirety of a single screen, but may also be determined excluding the periphery of the screen. This is because there are cases where non-meaningful data is included in the periphery of the screen. In addition, when determining the threshold values th[1] through th[n−1] necessary in n value conversion, the first threshold value th[1] was determined. Following this the second and third threshold values were determined by dividing the cumulative frequencies in the area with lower brightness than the first threshold value th[1] into n−1 equal parts. However, such example is merely illustrative and not limiting, since it would be fine to divide this into unequal parts having a specific weighting. Thus, depending on the image, there are cases where a visually better image results when dividing this into unequal parts having a weighting.

Furthermore, in the second described embodiment, an explanation was given for an n value conversion process using a dither process as the method for reducing the smearing of the background area caused by the effects of shading. However, it would also be fine to use, in place of the dither process, another method that obtains a two-dimensional gradation, such as the error diffusion method.

The processing program for accomplishing the processes of the invention can be stored on a storage medium such as a floppy disk. While the invention may include such storage media, it also may be of an arrangement that obtains data from a network.

As explained above, in accordance with the invention, when image data with numerous values is converted into image data having a small number of gradations, it is possible to determine the first through n−1st (n>2) threshold values by merely adding a slight computation to the so-called Ohtsu method. At such time, the first threshold value is computed using as parameters the average brightness $\mu2$ and standard deviation $\sigma2$ of the second class C2 containing a great deal of background. Consequently, it is possible to set the boundary between the background and the line drawing in a suitable area for each image. Also, it is possible to obtain a visually good image even when the number of gradations is reduced.

In addition, for images having shading that are photographed by an area sensor such as, for example, a CCD camera, a determination is made as to whether the pixels thereof are background or are meaningful information. In the case of background pixels, an n value conversion process is accomplished using a method that obtains two-dimensional gradations. When the pixel comprises meaningful information, such as characters, an n value conversion process is accomplished using the above-described first through n−1st threshold values. Accordingly, a process is accomplished which preserves the edges in, for example, characters. Also, it is possible to accomplish an n value conversion process that reduces the effects of shading for information such as the background.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image processing apparatus wherein image data, having a brightness range in designated gradations and including at least a background and meaningful information in the background, is converted to image data in n gradations (n>2), with n differing from said designated gradations, comprising:

a parameter computation unit that determines the cumulative frequency distribution of the pixels for each brightness from the image data having said brightness range in the designated gradations, and that determines the average brightness and standard deviation of the part wherein the background is predominant from the cumulative frequency distribution;

a threshold value computation unit that determines a first threshold value, that is an indicator of the boundary between the background and said meaningful information, on the basis of said average brightness and standard deviation of the part wherein the background is predominant as determined by said parameter computation unit, and that determines second through n−1st threshold values corresponding to said meaningful information on the basis of said first threshold value; and an n value conversion process unit that performs an n value conversion process on said image data using the first through n−1st threshold values determined by said threshold value computation unit.

2. An image processing apparatus, wherein image data, having a brightness range in designated gradations and including at least a background and meaningful information in the background, is converted to image data in n gradations (n>2), with n differing from said designated gradations, comprising:

a parameter computation unit that determines the cumulative frequency distribution of the pixels for each brightness from the image data having said brightness range in the designated gradations, and that determines the average brightness and standard deviation of the part wherein the background is predominant from the cumulative frequency distribution;

a threshold value computation unit that determines a first threshold value, that is an indicator of the boundary between the background and said meaningful information, on the basis of said average brightness and standard deviation of the part where the background is predominant, as determined by said parameter computer, and that determines second through n−1st threshold values corresponding to said meaningful information on the basis of said first threshold value; and an n value conversion process unit that reduces the effects of shading, the n value conversion process unit making a determination as to whether there are effects from shading on the basis of a brightness value of the pixel being processed, the n value conversion process unit, for pixels for which it is determined that there are effects from shading, making a determination as to whether that pixel is in the background or the meaningful information, the n value conversion process unit performing an n value conversion process through a gradation process having two-dimensional gradations when a background pixel, and the n value conversion process unit performing an n value conversion process using said first through n−1st threshold values when the pixel is one including the meaningful information.

3. The image processing apparatus according to claim 1, wherein said first threshold value is determined by said threshold value computation unit on the basis of the average brightness and standard deviation of the part wherein the background is predominant from the cumulative frequency distribution, and the threshold value computation unit subtracts from said average brightness a value obtained by multiplying the standard deviation by a designated coefficient.

4. The image processing apparatus according to claim 1, wherein determining the second through n−1st threshold values on the basis of said first threshold value, determined by said threshold value computation unit, determines the total of the cumulative frequencies for each brightness in the brightness range corresponding to the meaningful information, divides this total of the cumulative frequencies by n−1 and sets respective threshold values as the brightness value for each cumulative frequency obtained by dividing by n−1.

5. The image processing apparatus according to claim 4, wherein dividing the total of said cumulative frequencies by n−1 includes dividing the total of the cumulative frequencies for each brightness in the brightness range corresponding to the meaningful information into n−1 equal parts.

6. The image processing apparatus according to claim 4, wherein dividing the total of said cumulative frequencies by n−1 includes dividing the total of the cumulative frequencies for each brightness in the brightness range corresponding to the meaningful information into n−1 unequal parts with weighting.

7. The image processing apparatus according to claim 2, wherein the gradation process having two-dimensional gradations is a gradation process using the dither method.

8. The image processing apparatus according to claim 1, wherein the meaningful information in said background is line drawing information.

9. The image processing apparatus according to claim 8, wherein the meaningful information in said background is at least one of characters or a diagram.

* * * * *